United States Patent
Liu et al.

(10) Patent No.: US 8,623,534 B2
(45) Date of Patent: Jan. 7, 2014

(54) ANNULAR DEVICE WITH BATTERY COVER

(75) Inventors: Rui Liu, Shenzhen (CN); Gang Cheng, Shenzhen (CN); Meng-Hua He, Shenzhen (CN); Jia-Ning Huang, Shenzhen (CN); Te-Sheng Jan, Taipei Hsien (TW); Yu-Tao Chen, Taipei Hsien (TW); Chun-Che Yen, Taipei Hsien (TW)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 471 days.

(21) Appl. No.: 12/889,420

(22) Filed: Sep. 24, 2010

(65) Prior Publication Data
US 2011/0212353 A1 Sep. 1, 2011

(30) Foreign Application Priority Data
Feb. 26, 2010 (CN) .......................... 2010 1 0114871

(51) Int. Cl.
*H01M 2/10* (2006.01)

(52) U.S. Cl.
USPC ................ 429/100; 429/96; 429/98; 429/163

(58) Field of Classification Search
None
See application file for complete search history.

(56) References Cited

U.S. PATENT DOCUMENTS

2006/0287013 A1* 12/2006 Kim ............................ 455/575.1
2010/0119925 A1* 5/2010 Chen ............................. 429/100

* cited by examiner

*Primary Examiner* — Ula C Ruddock
*Assistant Examiner* — Tony Chuo
(74) *Attorney, Agent, or Firm* — Altis Law Group, Inc.

(57) ABSTRACT

An annular device includes an annular main body, a battery mounting portion, and a battery cover. The battery mounting portion protrudes from an inner surface of the main body, and includes a first arcuate element and a second arcuate element opposite to each other. The battery cover is operable to clasp the battery mounting portion, and includes a first arcuate member and a second arcuate member opposite to each other. The first arcuate member clasps the first arcuate surface, and the second arcuate member clasps the second arcuate surface.

6 Claims, 4 Drawing Sheets

ANNULAR DEVICE WITH BATTERY COVER

TECHNICAL FIELD

The present disclosure relates to devices and, particularly, to an annular device with a battery cover.

DESCRIPTION OF RELATED ART

An electronic device such as a television remote usually has a rectangular profile and includes a removable battery cover. The battery cover can be removably connected to the main body of the remote by conventional connection techniques. However, for devices with unusual shapes such as annular, the conventional connection techniques may not be suitable.

BRIEF DESCRIPTION OF THE DRAWINGS

The components of the drawings are not necessarily drawn to scale, the emphasis instead being placed upon clearly illustrating the principles of an annular device. Moreover, in the drawings, like reference numerals designate corresponding parts throughout several views.

DETAILED DESCRIPTION

Figure 1:
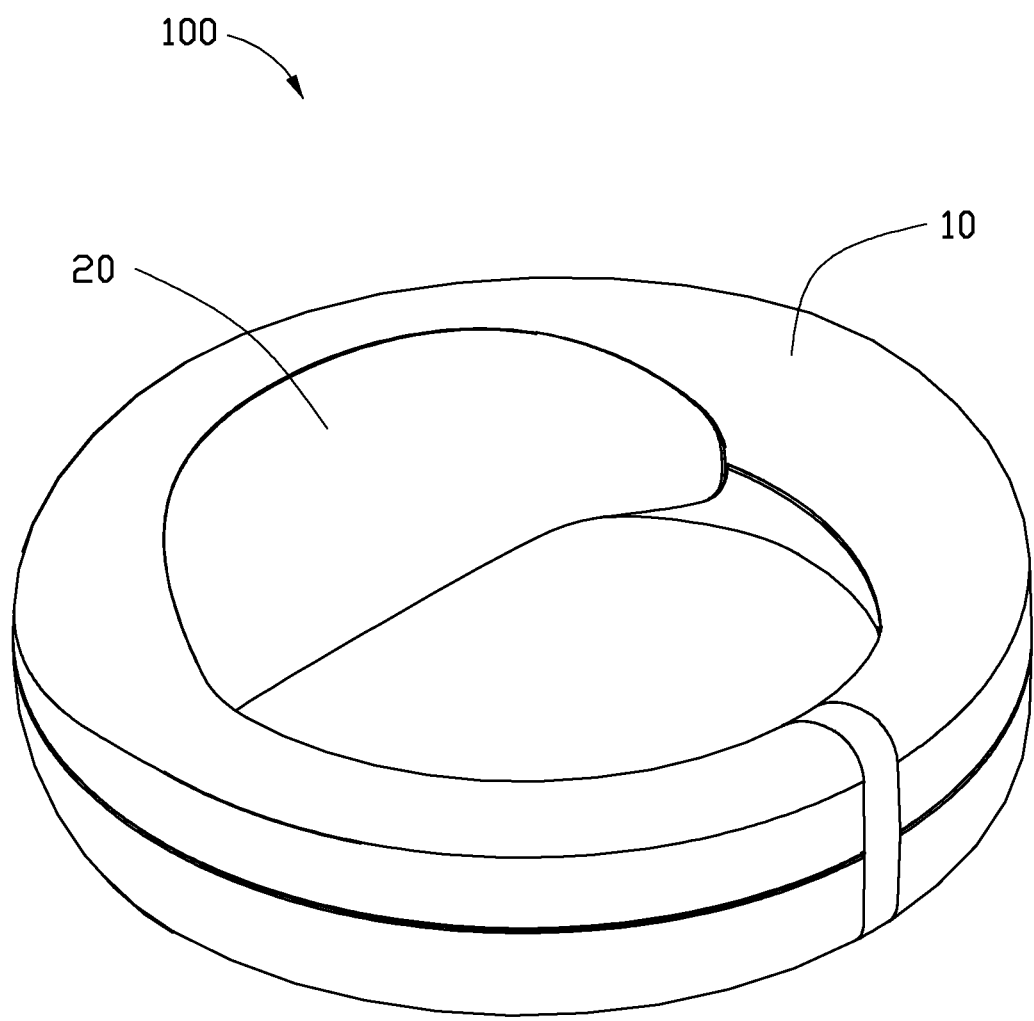
FIG. 1 is an isometric, assembled view of an annular device in accordance with an exemplary embodiment.

FIG. 1 is an isometric, assembled view of an annular device 100. The annular device 100 includes a main body 10 and a battery cover 20 connected to the main body 10. The main body 10 is substantially ring-shaped.

Figure 2:
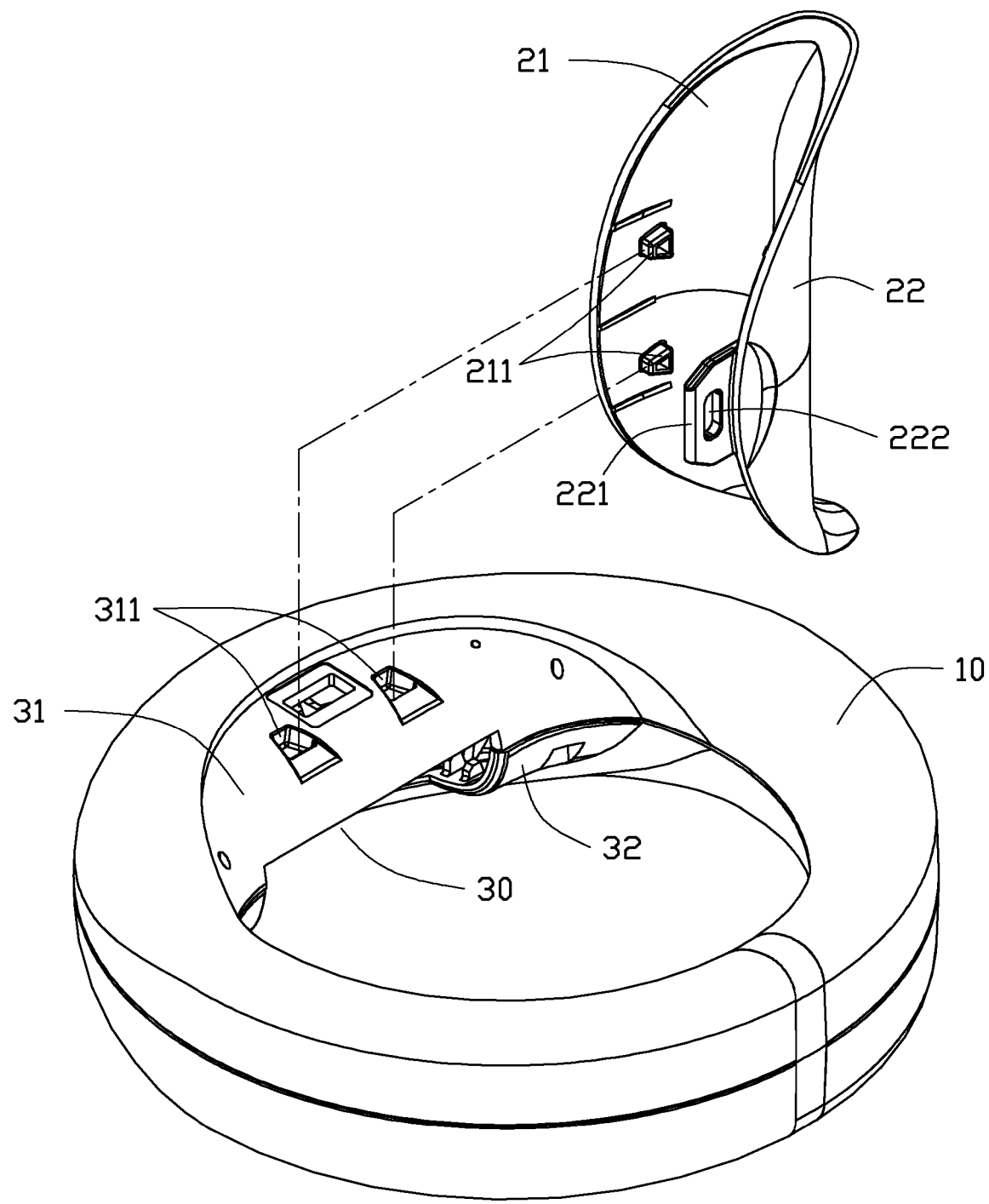
FIG. 2 is an exploded, isometric view of the annular device in FIG. 1.
Figure 3:
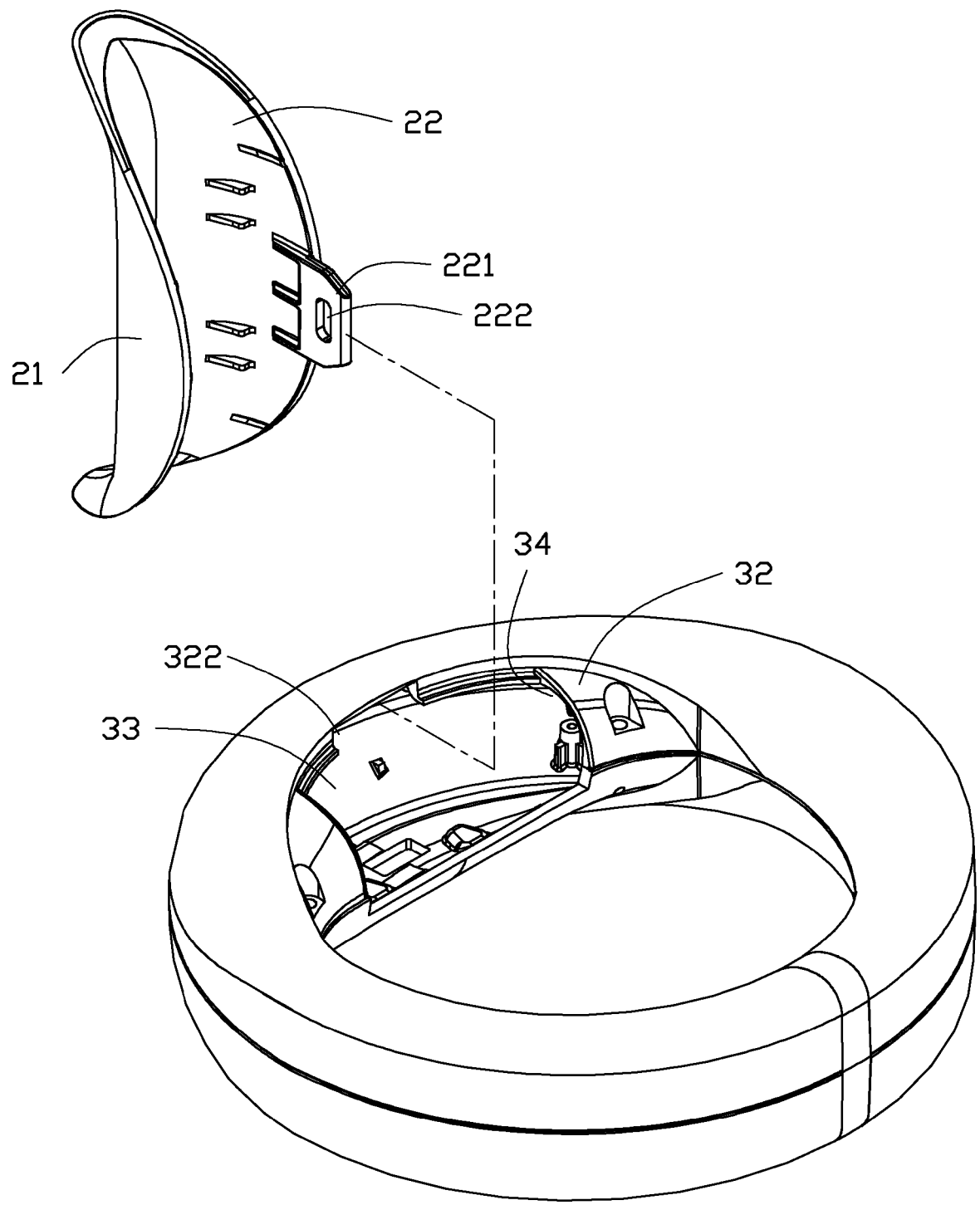
FIG. 3 is an exploded, isometric view of the annular device of FIG. 1 viewed from another viewpoint.

Referring to FIGS. 2-3, a battery mounting portion 30 protrudes from an inner face of the main body 10. The battery mounting portion 30 includes a first arcuate element 31 and a second arcuate element 32 opposite to each other. The first arcuate element 31 and the second arcuate element 32 cooperatively define a receiving space 33 for receiving one or more batteries (not shown). The second arcuate element 32 defines an opening 34 for accessing the receiving space 33. The cover 20 covers the opening 34 for securing the batteries in the receiving space 33. When the cover 20 is removed from the opening 34, the batteries can be taken out through the opening 34.

The shape of the battery cover 20 matches the shape of the battery mounting portion 30. The battery cover 20 includes a first arcuate member 21 and a second arcuate member 22 opposite to each other. The annular device 100 also includes a first fastening portion for connecting the first arcuate member 21 with the first arcuate element 31, and a second fastening portion for connecting the second arcuate member 22 with the second arcuate element 31.

In an exemplary embodiment, the first fastening portion includes two first protrusions 211 and two corresponding cutouts 311. The two first protrusions 211 are formed on the inner surface of the first arcuate member 21. The two cutouts 311 are defined in the outer surface of the first arcuate element 31. The first protrusions 211 can be respectively fit into the cutouts 311.

Figure 4:
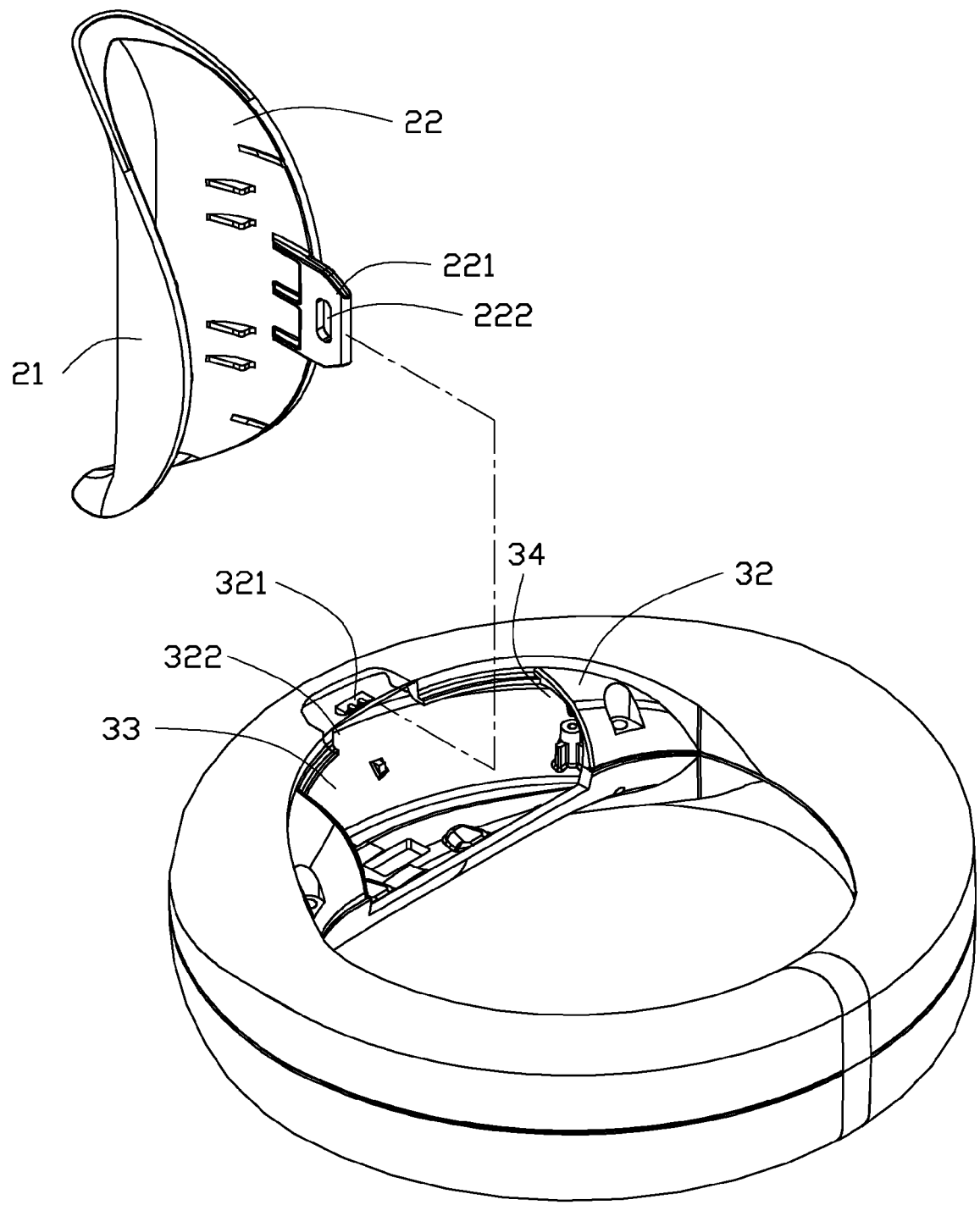
FIG. 4 is similar to FIG. 3, but showing a cut away view of a groove.

The second fastening portion includes a protruding tab 221 and a restriction groove 322. The protruding tab 221 protrudes from an edge of the second arcuate member 22 at a middle position. A clasping hole 222 is defined in the protruding tab 221. The restriction groove 322 is formed in the inner surface of the main body 10, and communicates with the opening 34. The restriction groove 322 is used to receive the protruding tab 221. Referring to FIG. 4, the bottom of the groove 322 includes a second protrusion 321.

When attaching the battery cover 20 onto the battery mounting portion 30, the cover 20 is orientated to cause the protruding tab 221 to align with the groove 322. The cover 20 is then pushed to allow the protruding tab 221 to move into the groove 322. During the pushing, the first arcuate member 21 and the second arcuate member 22 are caused to move a little away from each other, until the second protrusion 321 is received in the clasping hole 222 and the first protrusions 211 are received in the cutouts 311, which tightly connects the cover 20 to the main body 10.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An annular device comprising:
   an annular main body defining a through hole;
   a battery mounting portion arranged in the through hole and protruding from an inner side surface of the main body in the through hole, the battery mounting portion comprising a first arcuate element with an outwardly curved surface and a second arcuate element with an outwardly curved surface opposite to each other and cooperatively defining a receiving space; and
   a battery cover operable to clasp the battery mounting portion, comprising a first arcuate member and a second arcuate member opposite to each other;
   wherein the first arcuate member clasps the first arcuate element, and the second arcuate member clasps the second arcuate element.

2. The annular device as claimed in claim 1, wherein the second arcuate element defines an opening for accessing the receiving space to allow batteries to be taken out of or inserted into the receiving space.

3. The annular device as claimed in claim 1, wherein at least one first protrusion is formed on an inner surface of the first arcuate member, and at least one cutout is defined in an outer surface of the first arcuate element, and the at least one first protrusion can be fit into the at least one cutout.

4. The annular device as claimed in claim 2, wherein a protruding tab protrudes from an edge of the second arcuate member, a clasping hole is defined in the protruding tab, a restriction groove is formed in the inner surface of the main body and communicates with the opening, the restriction groove is used to receive the protruding tab, a bottom of the groove forms a second protrusion, and the second protrusion can be fit into the clasping hole.

5. The annular device as claimed in claim 1, wherein a first arcuate member has a curved shape conforming to the shape of the outwardly curved surface of the first arcuate element and a second arcuate member has a curved shape conforming to the shape of the outwardly curved surface of the second arcuate element.

6. The annular device as claimed in claim 2, wherein the opening opens toward the through hole.

\* \* \* \* \*